United States Patent
Campbell et al.

(10) Patent No.: US 7,611,093 B2
(45) Date of Patent: Nov. 3, 2009

(54) DUAL FLOW APU INLET AND ASSOCIATED SYSTEMS AND METHODS

(75) Inventors: Thomas A. Campbell, Seattle, WA (US); David S. Chambers, Bellevue, WA (US); Robert H. Willie, Bothell, WA (US); Charles W. Rust, Seattle, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 11/829,497

(22) Filed: Jul. 27, 2007

(65) Prior Publication Data

US 2008/0179466 A1     Jul. 31, 2008

Related U.S. Application Data

(62) Division of application No. 10/974,167, filed on Oct. 26, 2004, now Pat. No. 7,344,107.

(51) Int. Cl.
    *B64D 41/00*     (2006.01)
(52) U.S. Cl. ........................... 244/58; 244/53 B
(58) Field of Classification Search ............. 244/1 R, 244/53 R, 58, 57, 53 B; 137/15.1
    See application file for complete search history.

(56) References Cited

U.S. PATENT DOCUMENTS

| | | | |
|---|---|---|---|
| 2,016,253 A | 10/1935 | Noblitt et al. | |
| 2,512,155 A | 6/1950 | Hill | |
| 2,988,302 A | 6/1961 | Smith | |
| 3,033,307 A | 5/1962 | Sanders et al. | |
| 3,353,626 A | 11/1967 | Cremer et al. | |
| 3,382,671 A | 5/1968 | Ehni, III | |
| 3,437,173 A | 4/1969 | Ehrich | |
| 3,439,774 A | 4/1969 | Callaway et al. | |
| 3,519,843 A | 7/1970 | Trautman | |
| 3,648,803 A | 3/1972 | Heath et al. | |
| 3,680,660 A | 8/1972 | Dubois | |
| 3,764,815 A | 10/1973 | Habock et al. | |
| 3,913,702 A | 10/1975 | Wirt et al. | |

(Continued)

FOREIGN PATENT DOCUMENTS

CA      2261730      2/1998

(Continued)

OTHER PUBLICATIONS

Aries Limited, "Model "A" Ford Tapered Muffler," mhtml:file;//C:/Temp/Model%20A%20Ford%20Tapered%20Muffler.mht, 1 page [Accessed May 28, 2004].

(Continued)

*Primary Examiner*—Timothy D Collins
(74) *Attorney, Agent, or Firm*—Perkins Coie LLP

(57) ABSTRACT

Dual flow auxiliary power unit (APU) inlets and associated systems and methods are disclosed. An inlet in accordance with one embodiment of the invention includes an entrance aperture and a divider positioned in the inlet and located to separate a first portion of the inlet from a second portion of the inlet. The first portion can be configured to couple to an engine air intake of an APU, and the second portion can be configured to direct air away from the air intake. The divider can be positioned to direct air having a first total pressure level and a first distortion level to the first portion of the inlet, and direct air having a second total pressure level and second distortion level to the second portion of the inlet. The first total pressure level can be approximately the same as or higher than the second total pressure level, or the second distortion level can be approximately the same as or higher than the first distortion level, or both.

36 Claims, 5 Drawing Sheets

U.S. PATENT DOCUMENTS

| | | | |
|---|---|---|---|
| 3,920,095 | A | 11/1975 | Clark |
| 4,001,892 | A | 1/1977 | Castelli et al. |
| 4,064,961 | A | 12/1977 | Tseo |
| 4,091,892 | A | 5/1978 | Hehmann et al. |
| 4,137,992 | A | 2/1979 | Herman |
| 4,226,297 | A | 10/1980 | Cicon |
| 4,244,441 | A | 1/1981 | Tolman |
| 4,314,621 | A | 2/1982 | Hansen |
| 4,359,136 | A | 11/1982 | Eriksson |
| 4,360,075 | A | 11/1982 | Blaser et al. |
| 4,370,560 | A | 1/1983 | Faulkner et al. |
| 4,371,053 | A | 2/1983 | Jones |
| 4,418,879 | A | 12/1983 | Vanderleest |
| 4,456,830 | A | 6/1984 | Cronin |
| 4,645,032 | A | 2/1987 | Ross et al. |
| 4,706,908 | A | 11/1987 | Huffman et al. |
| 4,744,440 | A | 5/1988 | Hanson |
| 4,979,587 | A | 12/1990 | Hirt et al. |
| 5,162,620 | A | 11/1992 | Ross et al. |
| 5,268,541 | A | 12/1993 | Pettersson |
| 5,365,025 | A | 11/1994 | Kraai et al. |
| 5,655,359 | A | 8/1997 | Campbell |
| 5,734,239 | A | 3/1998 | Turner |
| 5,735,116 | A | 4/1998 | Mouton et al. |
| 5,899,411 | A | 5/1999 | Latos et al. |
| 5,902,970 | A | 5/1999 | Ferri |
| 6,018,233 | A | 1/2000 | Glennon |
| 6,039,287 | A | 3/2000 | Liston et al. |
| 6,092,360 | A | 7/2000 | Hoag et al. |
| 6,158,546 | A | 12/2000 | Hanson et al. |
| 6,244,539 | B1 | 6/2001 | Liston et al. |
| 6,264,137 | B1 | 7/2001 | Sheoran |
| 6,272,838 | B1 | 8/2001 | Harvell et al. |
| 6,360,844 | B2 | 8/2001 | Hogeboom et al. |
| 6,308,915 | B1 | 10/2001 | Liston et al. |
| 6,508,219 | B2 | 3/2002 | Schorn |
| 6,695,094 | B2 | 8/2002 | Moffat et al. |
| 6,651,929 | B2 | 5/2003 | Dionne |
| 6,615,576 | B2 | 9/2003 | Sheoran et al. |
| 6,698,180 | B2 | 3/2004 | Snyder |
| 6,777,822 | B1 | 8/2004 | Suttie et al. |
| 2002/0139120 | A1 | 10/2002 | Sheoran et al. |
| 2003/0126864 | A1 | 7/2003 | Thompson |
| 2004/0129835 | A1 | 7/2004 | Atkey et al. |
| 2006/0043236 | A1 | 3/2006 | Campbell |
| 2006/0071123 | A1 | 4/2006 | Nguyen |
| 2006/0102779 | A1 | 5/2006 | Campbell |
| 2006/0102781 | A1 | 5/2006 | Hein et al. |
| 2006/0168968 | A1 | 8/2006 | Zielinski |
| 2007/0063098 | A1 | 3/2007 | Dionne |

FOREIGN PATENT DOCUMENTS

| | | |
|---|---|---|
| DE | 69712210 | 10/2002 |
| DE | 69712797 | 11/2002 |
| EP | 0923488 | 4/2002 |
| EP | 1010618 B1 | 5/2002 |
| EP | 1686058 | 8/2006 |
| JP | 57-113919 | 7/1982 |
| JP | 05-163925 | 6/1993 |
| JP | 2000516553 | 12/2000 |
| WO | WO-9805553 | 2/1998 |
| WO | WO-01/47100 | 6/2001 |

OTHER PUBLICATIONS

Henri Coanda, mhtml:file://C:\TEMP\Henri%20Coanda.mht, pp. 1-3 [Accessed May 28, 2004].

Michael Andretti Powersports, "Titanium Oval Muffler," mhtml:file://C:\TEMP\OVAL%MUFFLER%20-%20step%20increases.mht, pp. 1-2 [May 28, 2004].

U.S. Appl. No. 11/527,213, Lwasa et al.

UK Intellectual Property Office Search Report and Examination Report for GB0521761.7, The Boeing Company, UK Intellectual Property Office, Jun. 28, 2007, 4 pages.

What About Transfer Switches?, <http://www.generatorjoe.net/html/WhatAboutsws.html>, copyright Quartz Castle Inc. & GeneratorJoe, accessed Aug. 9, 2007, 8 pages.

Brady, Chris, The 737 APU: Auxilary Power Unit, The APU described, <http://www.b737.org.uk/apu.htm>, updated Jun. 18, 2007, accessed Aug. 9, 2007, 12 pages.

Image of AC/DC Metering Panel, <http://www.b737.org.uk/acdcmeteringpanel.jpg>, accessed Aug. 9, 2007, 1 page.

DUAL FLOW APU INLET AND ASSOCIATED SYSTEMS AND METHODS

CROSS-REFERENCE TO RELATED APPLICATION

This application is a divisional of U.S. application Ser. No. 10/974,167, filed Oct. 26, 2004.

TECHNICAL FIELD

The present invention relates generally to dual flow auxiliary power unit (APU) inlets and associated systems and methods.

BACKGROUND

Existing commercial transport jet aircraft typically include two or more primary turbine engines for propulsion. These aircraft also typically include at least one auxiliary power unit (APU) that provides electrical and/or pneumatic power in addition to or in lieu of the power provided by the primary engines. Accordingly, APUs can be used to provide power to the aircraft when the primary engines are not running, for example, when the aircraft is waiting at an airport gate. The APUs can also provide temporary power to start the primary engines during normal operations, and/or temporary emergency power during an engine-out condition or other emergency condition.

APUs typically include a gas turbine engine that receives air from an APU inlet. FIG. 1 is a partially schematic illustration of an APU 10 housed in an APU compartment 44 in accordance with the prior art. The APU compartment 44 is located within an external fuselage surface 45 of an aircraft. The APU 10 receives air via an inlet 20 that extends from the APU 10 to the external fuselage surface 45. A deployable door 50 opens when the APU 10 is started, and closes when the APU 10 is shut down. The inlet 20 includes a splitter 25 that directs some of the captured air directly to the APU air intake via an APU duct 27, as indicated by arrow A. The remaining air is directed into the APU compartment 44 via an eductor duct 28 (as indicated by arrow E) to ventilate the compartment 44 and to transfer heat from an oil cooler of the APU 10.

While the foregoing arrangement described above with reference to FIG. 1 provides sufficient air to run the APU 10, cool the APU oil, and ventilate the APU compartment 44, the efficiency with which it does so may in some cases not be optimal. Accordingly, it may be desirable to improve the efficiency of the inlet 20 so as to increase the performance of the APU 10, and/or decrease the size and weight of the APU 10.

SUMMARY

The present invention is directed generally to dual flow APU inlets and associated systems and methods. An inlet system for an aircraft auxiliary power unit in accordance with one aspect of the invention includes an inlet having an entrance aperture, and a divider positioned in the inlet. The divider is located to separate a first portion of the inlet from a second portion of the inlet, with the first portion being configured to couple to an engine air intake of an aircraft auxiliary power unit, and the second portion being configured to direct air away from the air intake. The divider is positioned to direct air having a first total pressure level and a first distortion level to the first portion of the inlet, and direct air having a second total pressure level and a second distortion level to the second portion of the inlet. In a particular aspect of this embodiment, the first total pressure level is approximately the same as or higher than the second total pressure level, or the second distortion level is approximately the same as or higher than the first distortion level, or both.

In further aspects of the invention, the entrance aperture of the inlet can have a first surface portion positioned to be proximate to an aircraft fuselage, a second surface portion spaced apart from the first surface portion, and third and fourth surface portions extending between the first and second surface portions. The inlet system can further include a first divider positioned in the inlet and generally aligned with the third surface portion, and a second divider positioned in the inlet and generally aligned with the fourth surface portion. The inlet duct can include a first flow channel between the first and second dividers, a second flow channel between the first divider and the third surface portion, and a third flow channel between the second divider and the fourth surface portion. The first flow channel can be configured to couple to the engine air intake of the auxiliary power unit, and the second and third flow channels can be configured to direct air away from the air intake.

The invention is also directed toward methods for providing flow to an aircraft auxiliary power unit. A method in accordance with one aspect of the invention includes receiving flow in an inlet, providing a first portion of the flow having a first total pressure level and a first distortion level to an engine airtake of the auxiliary power unit, and directing a second portion of the flow having a second total pressure level and a second distortion level away from the engine air intake. In a particular aspect of this embodiment, the first total pressure level is approximately the same as or higher than the second total pressure level, or the second distortion level is approximately the same as or higher than the first distortion level, or both. In a further particular aspect of the invention, directing a second portion of the flow can include directing a vortex flow away from the engine air intake.

In another aspect of the invention, the method can include separating a central portion of the flow received in the inlet from at least one peripheral portion of the flow, with the at least one peripheral portion being displaced laterally from the central portion. The central portion can be directed to an air intake of the aircraft auxiliary power unit, and the at least one peripheral portion can be directed into a compartment in which the auxiliary power unit is housed.

DETAILED DESCRIPTION

The present invention is directed generally toward dual flow auxiliary power unit (APU) inlets and associated systems and methods. Several embodiments of systems and methods for controlling the flow of air directed to APUs and associated compartments are described below. A person skilled in the relevant art will understand, however, that the invention may have additional embodiments, and that the invention may be practiced without several of the details of the embodiments described below with reference to FIGS. 2-7.

Figure 2:
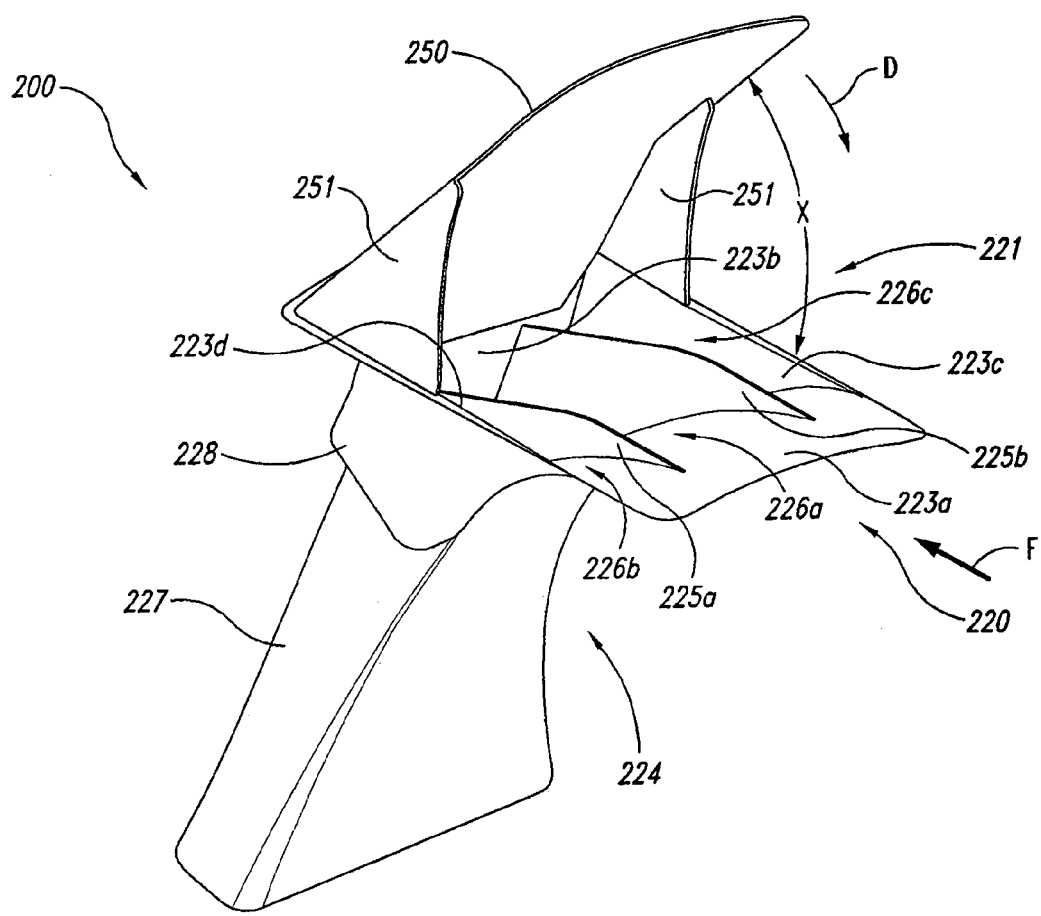
FIG. 2 is a partially schematic, isometric illustration of an APU inlet configured in accordance with an embodiment of the invention.

FIG. 2 is a partially schematic, isometric view of a system 200 configured to provide air to an APU and an APU compartment, in accordance with an embodiment of the invention. In one aspect of this embodiment, the system 200 includes an inlet 220 that is configured to provide a first flow to the APU (not shown in FIG. 2) and a separate, second flow to the compartment in which the APU is housed. The two flows (each of which can be further divided) are separated from each other in a manner that can provide flow to the APU having a pressure recovery level as high or higher than that of the flow provided to the APU compartment. The distortion level of this flow can be as low or lower than that of the flow provided to the APU compartment. As used herein, the term "distortion" refers generally to flow non-uniformity (e.g., pressure and/or velocity non-uniformity), and can be measured using any of a variety of techniques known to those of ordinary skill in the relevant art. By separating the flows in this manner, relatively high pressure, low distortion air flow can be provided to the APU, which benefits from flows having such characteristics. Air flow potentially having lower total pressure and/or higher distortion levels can be provided to the compartment, which tends not to suffer significantly adverse effects from flows having such characteristics. Further details of embodiments of the invention having these characteristics are described below.

In one embodiment shown in FIG. 2, the inlet 220 can have a generally rectangular aperture 221 and can include a first or forward surface 223a, an aft or second surface 223b, a third or side surface 223c, and an opposite fourth or side surface 223d. In other embodiments, the inlet aperture 221 can have other shapes. In any of these embodiments, the inlet 220 can include at least one divider 225 (two dividers are shown in FIG. 2 as a first divider 225a and a second divider 225b). The divider(s) 225 can extend in a generally axial direction to laterally separate flow having relatively high pressure and low distortion from flow that may have lower pressure and/or higher distortion. For example, the dividers 225 can separate the inlet aperture 221 into a first (e.g., central) flow channel 226a, a second (e.g., peripheral) flow channel 226b, and a third (e.g., also peripheral) flow channel 226c. The first flow channel 226a can receive a portion of the free stream air (represented by arrow F) and provide air flow directly to an APU duct 227, which in turn provides air to an APU air intake. The second and third flow channels 226b, 226c can each provide flow directly to corresponding eductor ducts 228 (one of which is visible in FIG. 2), which in turn provide the flow to the compartment in which the APU is housed. All three ducts can extend away from the aperture 221, generally transverse to the plane of the aperture 221.

The system 200 can further include a deployable door 250 that moves between an open position (shown in FIG. 2) in which it aids in capturing air for the inlet 220, and a closed position in which the door 250 moves downwardly as indicated by arrow D to seal the aperture 221. Angle X represents the amount by which the door 250 is opened. The door 250 can include sidewalls 251 that restrict or prevent air from spilling around the inlet aperture 221, and that recess into slots around the aperture 221 when the door 250 is closed. When the door 250 is closed, it can seal against the dividers 225a, 225b to prevent communication between the first flow channel 226a and the second and third flow channels 226b, 226c.

Figure 3A:
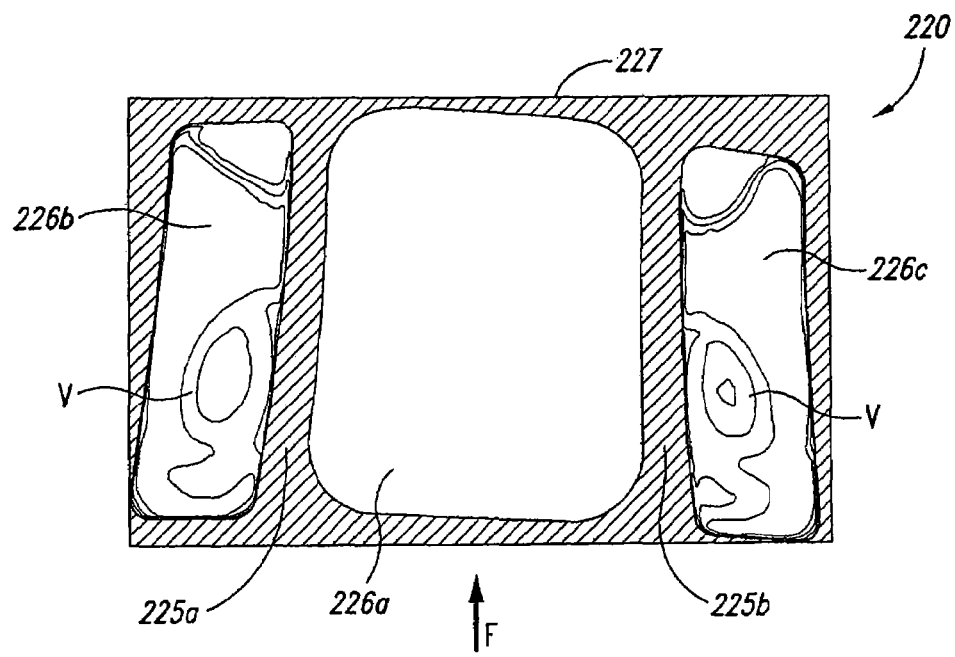
FIG. 3A is a partially schematic illustration of predicted pressure contours within an inlet configured in accordance with with an embodiment of the invention.
Figure 3B:
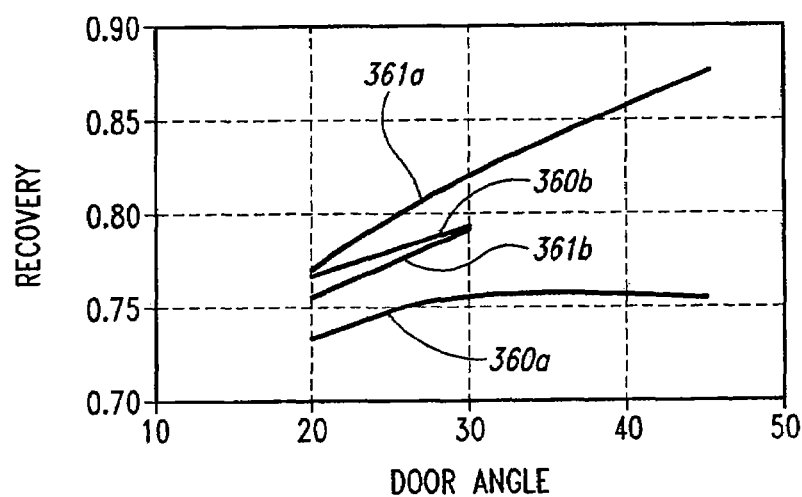
FIG. 3B is a graph comparing total pressure recovery for an inlet in accordance with an embodiment of the invention, with an inlet in accordance with the prior art.

FIGS. 3A and 3B illustrate predicted pressure contours and pressure recovery levels, respectively, for an APU inlet 220 having a configuration generally similar to that shown and described above with reference to FIG. 2. FIG. 3A illustrates predicted pressure level contours at a plane generally perpendicular to the air flow direction at a minimum area section of the APU duct 227. As shown in FIG. 3A, the first channel 226a has a generally uniform pressure level over its entire cross-sectional area. The second and third channels 226b, 226c, each include flows that are less uniform, and in fact include vortices identified by the letter V in FIG. 3A. These vortices V tend to form when the aircraft in which the APU is housed is on the ground, and the APU is operating at normal power levels. The dividers 225a, 225b can prevent the vortices V from entering the first channel 226a, where they can reduce the efficiency of the APU to which the inlet 220 is coupled.

Figure 1:
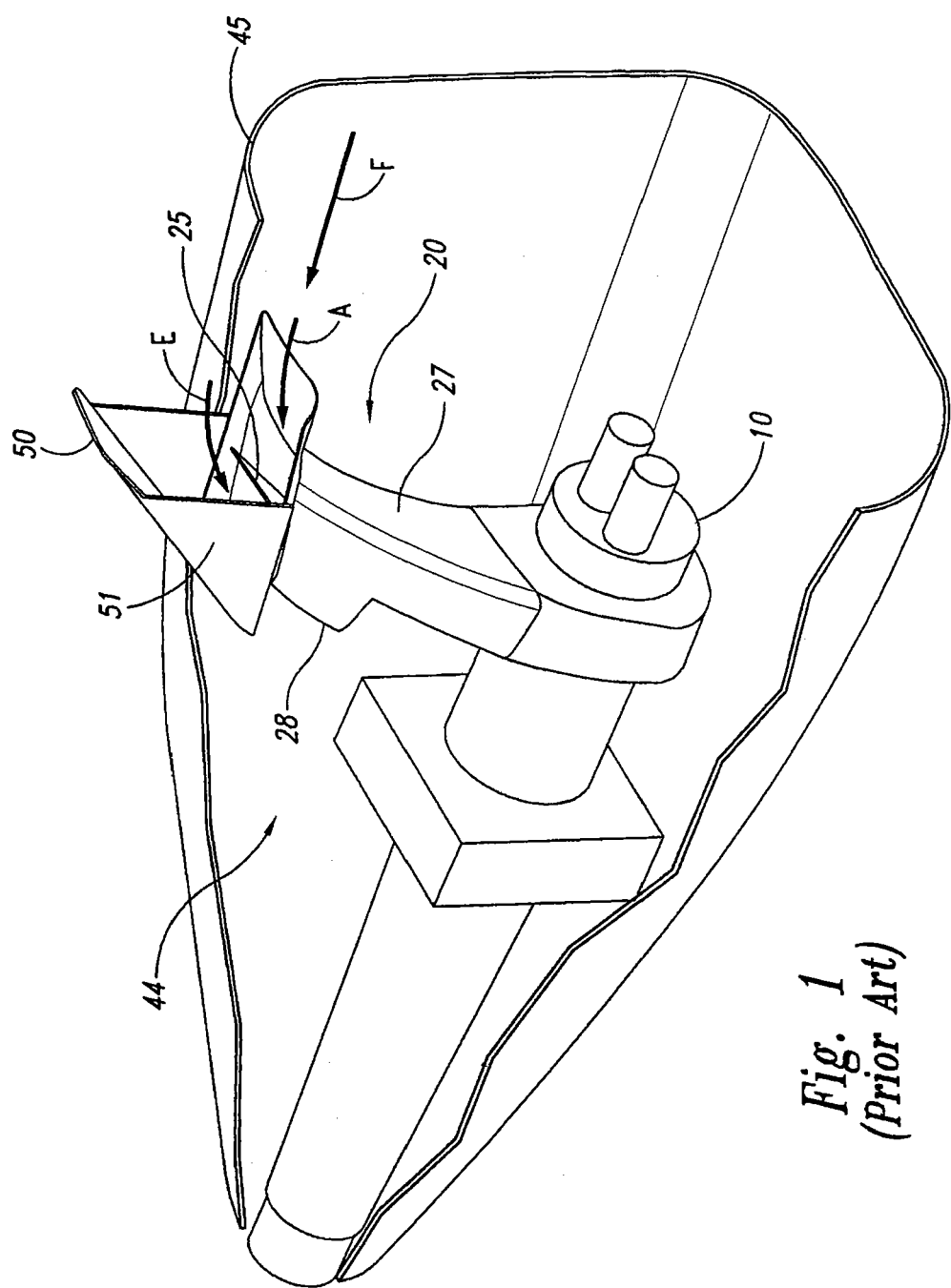
FIG. 1 is a partially schematic illustration of an auxiliary power unit (APU) and inlet, configured in accordance with the prior art.

FIG. 3B is a graph illustrating the inlet pressure recovery (e.g., the integrated total pressure at the air intake of the APU) as a function of X, the angular amount by which the inlet door is opened, for two inlets: one having a configuration generally similar to that shown in FIG. 2, and the other having a configuration generally similar to that shown in FIG. 1. Line 360a indicates expected pressure recovery levels for the APU duct 27 (FIG. 1), and line 361a illustrates expected recovery levels for the eductor duct 28 (FIG. 1). Accordingly, lines 360a and 361a indicate that the pressure recovery of air provided to the prior art APU air intake is less than that of air provided to the APU compartment.

Line 360b illustrates the expected pressure recovery level for air provided by the APU duct 227 shown in FIG. 2. Line 361b illustrates expected total pressure recovery levels for air provided by the eductor ducts 228 shown in FIG. 2. As is evident from FIG. 3B, the expected total pressure recovery of air provided to the APU duct 227 is higher than the expected total pressure recovery of air provided to the eductor ducts 228.

Figure 4:
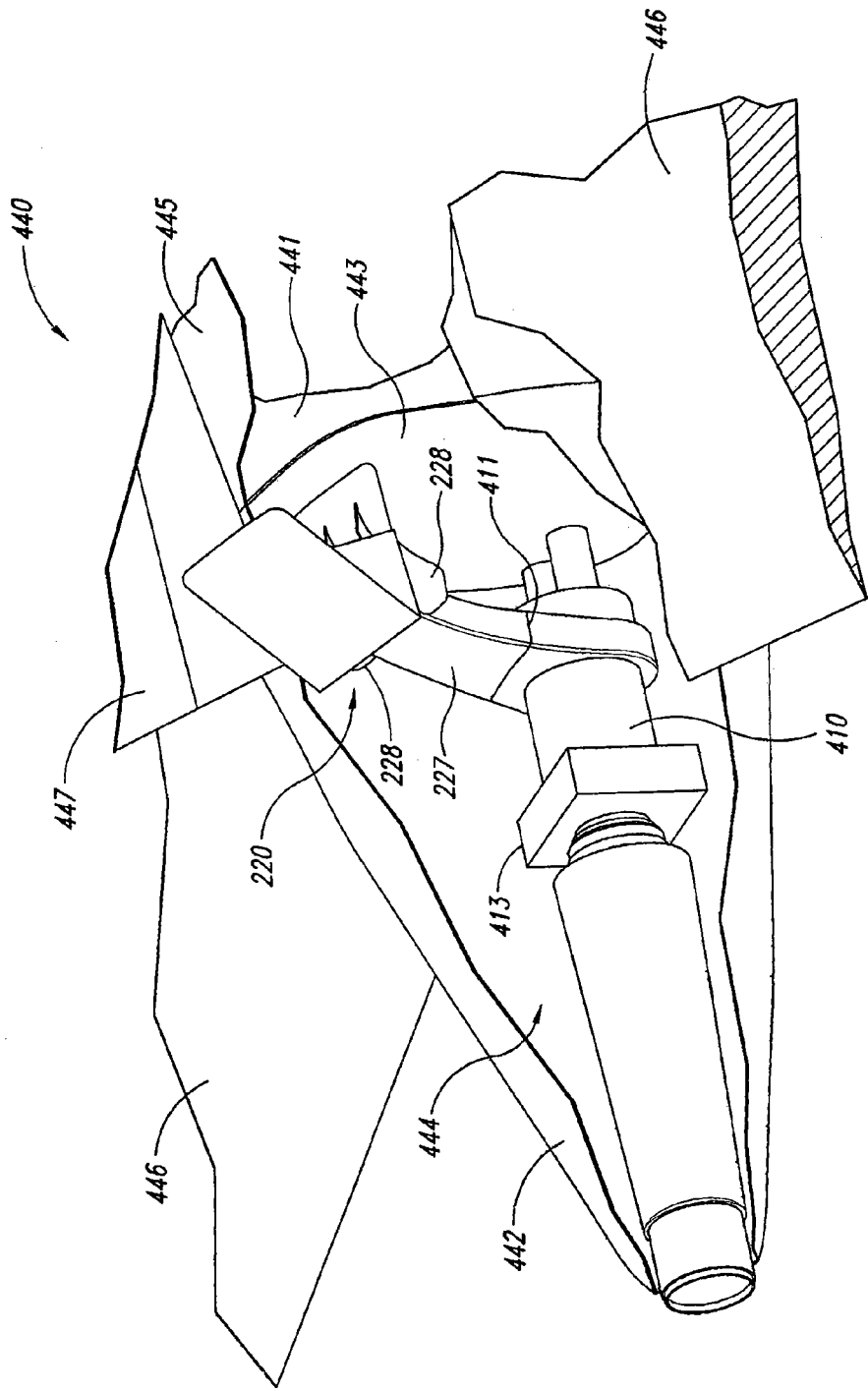
FIG. 4 is a partially schematic, partially broken away, isometric illustration of an APU inlet housed in an aircraft in accordance with an embodiment of the invention.

FIG. 4 illustrates an aft portion of an aircraft 440 in which the inlet 220 is installed, in accordance with an embodiment of the invention. The inlet 220 is coupled to an APU 410 that is positioned in an APU compartment 444. In one aspect of this embodiment, the aircraft 440 includes a fuselage 441, that in turn includes a tailcone 442. A firewall 443 separates the APU compartment 444 in the tailcone 442 from a forward portion of the fuselage 441. The fuselage 441 can also support horizontal stabilizers 446 and a vertical stabilizer 447. The inlet 220 can extend through an external surface 445 of the fuselage 441 to provide air directly to an engine air intake 411 of the APU 410 via the APU duct 227. The inlet 220 can provide additional air to the APU compartment 444 via the eductor ducts 228. The air provided to the APU compartment 444 can ventilate the compartment 444 and transfer heat from an APU oil cooler 413 (shown schematically in FIG. 4). In other embodiments, the APU 410 and the compartment 444 can be located at other portions of the aircraft 440, e.g., the aircraft wings.

One aspect of an embodiment of the system 200 described above with reference to FIGS. 2-4 is that the APU inlet 220 can provide an air flow having a relatively high total pressure recovery level and low distortion level directly to the air intake of the APU. The flow provided to the compartment that houses the APU can have a total pressure recovery level that may be less than or equal to the pressure recovery level of the air flow provided to the APU air intake, and a distortion level that may be the same as or higher than the distortion level of air flow provided to the APU air intake. An advantage of this arrangement is that the APU engine performs better when it receives high recovery, low distortion flow. Accordingly, the efficiency of the APU can be increased when it is coupled to an inlet having an arrangement in accordance with embodiments of the invention. In other aspects of the invention, the size of the APU, and therefore the overall weight of the aircraft in which the APU is installed can be reduced because the APU is more efficient. This can reduce the operating costs of the aircraft in which the APU is installed.

While the flow provided to the APU compartment may not have as high a recovery level or as low a distortion level as the flow provided to the APU inlet, it is nevertheless sufficient to provide ventilation for the compartment and cooling for the oil cooler 413. Neither of these functions need be significantly affected by the lower recovery level and/or the higher distortion level. Accordingly, this arrangement can provide benefits for the operation of the APU, without creating drawbacks for airflow in the compartment in which APU is housed.

Figure 5:
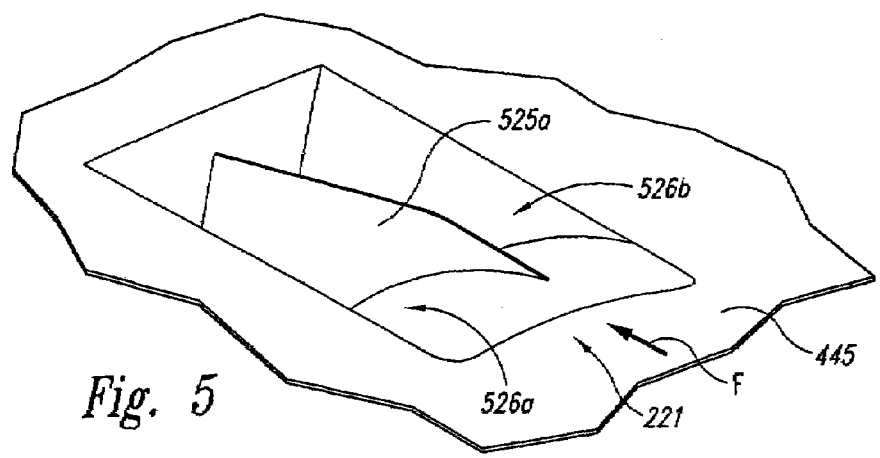
FIGS. 5-7 illustrate APU inlet geometries configured in accordance with still further embodiments of the invention.

In other embodiments, the system 200 described above can include APU apertures 221 having divider arrangements that differ from those described above. For example, referring now to FIG. 5, the APU aperture 221 can have a generally rectangular shape with a single divider 525a positioned to separate a first flow channel 526a from a second flow channel 526b. The first flow channel 526a can provide flow to an APU duct (not shown in FIG. 5) and the second flow channel 526b can provide flow to a single eductor duct (also not shown in FIG. 5). The lateral location of the divider 525a can be selected so that suitable fractions of the total air flow captured at the aperture 221 are directed to the APU air intake and the APU compartment, respectively. An advantage of an embodiment of the configuration shown in FIG. 5 is that it may be simpler to manufacture and install than the arrangement described above with reference to FIG. 2, because it includes only a single divider and eductor duct. Conversely, an advantage of the arrangement shown in FIG. 2 is that it can prevent vortices formed on both opposing side surfaces of the inlet from entering the APU duct, while the arrangement shown in FIG. 5 may prevent only one such vortex from entering the first flow channel 526a.

Figure 6:
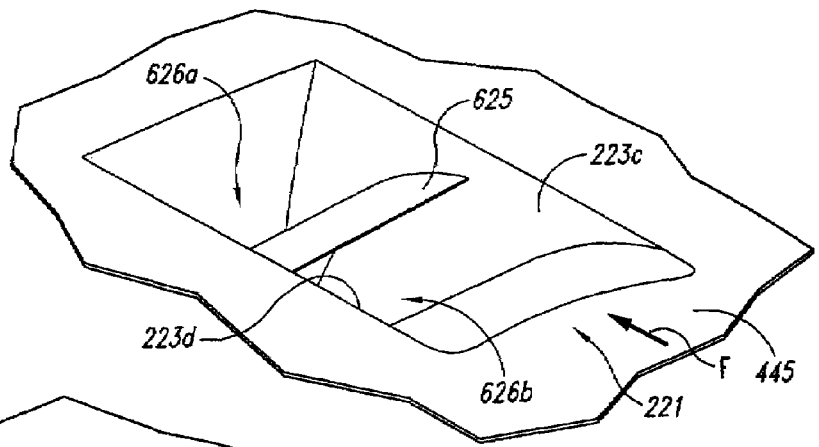

FIG. 6 illustrates the aperture 221 having a single divider 625 that extends laterally between the third surface 223c and the fourth surface 223d. Accordingly, the divider 625 can separate the inlet aperture 221 into a first flow channel 626a positioned aft of a second flow channel 626b. One feature of this arrangement is that it tends to direct flow positioned closer to the external surface 445 of the aircraft into the APU compartment, and direct flow further from the external surface 445 into the APU air intake. An advantage of this feature is that the flow positioned further away from the external surface 445 tends to have a higher pressure recovery level than the flow adjacent to the external surface. Accordingly, the overall performance of the APU to which the inlet is coupled can be increased when compared with conventional arrangements.

Figure 7:
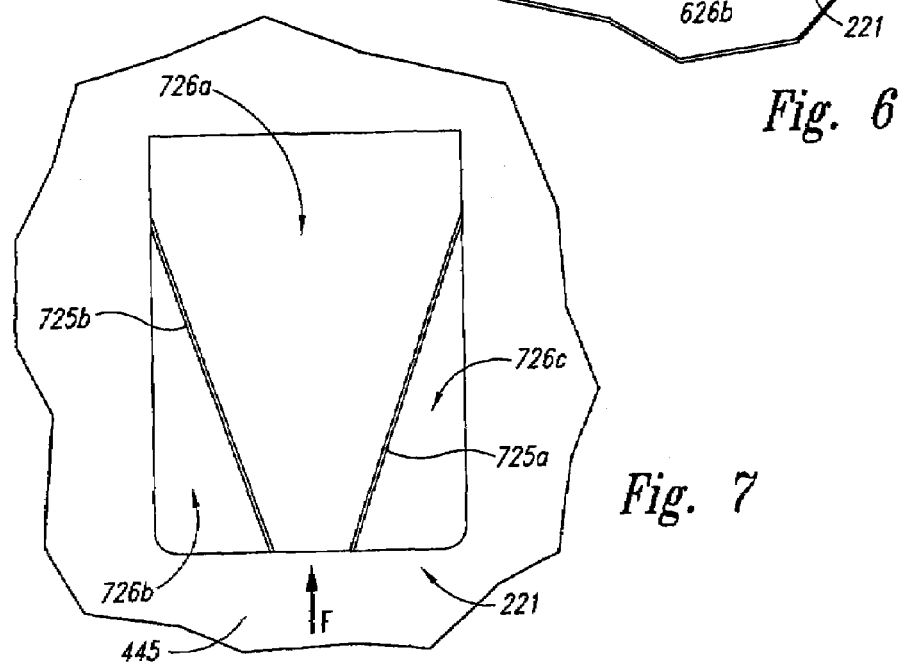

FIG. 7 is a top plan view of the inlet aperture 221 having two dividers 725, shown as a first divider 725a and a second divider 725b, which together separate the inlet aperture into a first flow channel 726a, a second channel 726b, and a third channel 726c. The first channel 726a can be coupled to the air intake of an APU, and the second and third flow channels 726b, 726c can direct flow into the compartment in which the APU is housed. One feature of an arrangement shown in FIG. 7 is that the dividers 725 are splayed outwardly. Accordingly, a greater fraction of the flow captured by the second and third channels 726b, 726c is captured from regions adjacent to the external surface 445. An advantage of this arrangement is that, as described above, the flow adjacent to the external surface 445 tends to have a lower total pressure recovery level than the flow that is spaced apart from the external surface 445, and may therefore be better suited for the APU compartment than for the APU air intake. A further advantage is that the splayed dividers 725 may nevertheless extend far enough aft to prevent vortices (such as those described above with reference to FIG. 3A) from entering the first flow passage 726a. Accordingly, the splayed dividers 725 may provide enhanced separation between flow having relatively high total pressure and/or low distortion on the one hand, and flow having lower total pressure and/or higher distortion on the other.

Systems in accordance with other embodiments of the invention can include still further features. For example, such systems can have inlet apertures with shapes other than the generally rectangular shapes described above. In still further embodiments, the systems can include devices other than dividers that also separate relatively high recovery, low distortion flow from relatively low recovery, high distortion flow. Such devices can include suction arrangements, for example, arrangements that suck or otherwise fluidically separate one portion of flow from another.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. An inlet system for an aircraft auxiliary power unit, comprising:

an inlet having an entrance aperture; and a divider positioned in the inlet, the divider being located to separate a first portion of the inlet from a second portion of the inlet, the first portion being configured to couple to an engine air intake of an aircraft auxiliary power unit, the second portion being configured to direct air away from the air intake, the divider being positioned to direct air having a first total pressure level and a first distortion level to the first portion of the inlet, and direct air having a second total pressure level and a second distortion level to the second portion of the inlet, with (a) the first total pressure level higher than the second total pressure level, and (b) the second distortion level higher than the first distortion level.

2. The system of claim 1 wherein the inlet includes an inlet duct elongated in a direction generally transverse to a plane of the entrance aperture.

3. The system of claim 1, further comprising:
the auxiliary power unit, and wherein the air intake of the auxiliary power unit is coupled to the first portion of the inlet; and
a compartment disposed around the auxiliary power unit, wherein the second portion of the inlet is positioned to direct air into the compartment.

4. The system of claim 1, further comprising an inlet door positioned at least proximate to the entrance aperture of the inlet, the inlet door being movable relative to the entrance aperture between an open position and a closed position.

5. The system of claim 1, further comprising an inlet door positioned at least proximate to the entrance aperture of the inlet, the inlet door being movable relative to the entrance aperture between an open position and a closed position, and wherein at least part of the inlet door sealably engages the divider when the inlet door is in the closed position.

6. The system of claim 1 wherein the divider is a first divider and wherein the system further comprises a second divider positioned to separate a third portion of the inlet from the first and second portions and direct a portion of the air away from the air intake.

7. The system of claim 1 wherein the inlet has an aperture edge, and wherein the divider is positioned at least approximately parallel to at least a portion of the aperture edge.

8. The system of claim 1 wherein the inlet has an aperture edge, and wherein the divider is oriented obliquely to the nearest portion of the aperture edge spaced apart from divider.

9. An inlet system for an aircraft auxiliary power unit, comprising:
an aircraft fuselage portion;
an inlet having an entrance aperture, the entrance aperture having a first surface portion positioned proximate to a surface of the aircraft fuselage portion, a second surface portion spaced apart from the first surface portion and located aft of the first surface portion, and third and fourth surface portions extending between the first and second surface portions; and
a divider positioned in the inlet and generally aligned with the third surface portion, wherein the inlet includes a first flow channel between the divider and the fourth surface portion, and a second flow channel between the divider and the third surface portion, the first flow channel being configured to couple to an engine air intake of an aircraft auxiliary power unit, the second flow channel being configured to direct air away from the air intake, the first flow channel being positioned to direct air having a first total pressure level and a first distortion level, the second flow channel being positioned to direct air having a second total pressure level and a second distortion level, with
(a) the first total pressure level higher than the second total pressure level, and
(b) the second distortion level higher than the first distortion level.

10. The system of claim 9 wherein the inlet aperture has a generally rectangular shape.

11. The system of claim 9, further comprising:
the auxiliary power unit, and wherein the air intake of the auxiliary power unit is coupled to the first flow channel of the inlet; and
a compartment disposed around the auxiliary power unit, wherein the second flow channel of the inlet is positioned to direct air into the compartment.

12. The system of claim 9, further comprising an inlet door positioned at least proximate to the entrance aperture of the inlet, the inlet door being movable relative to the aperture between an open position and a closed position.

13. An inlet system for an aircraft auxiliary power unit, comprising:
an aircraft fuselage portion;
an inlet having an entrance aperture, the entrance aperture having a first surface portion positioned proximate to a surface of the aircraft fuselage portion, a second surface portion spaced apart from the first surface portion and located aft of the first surface portion, and third and fourth surface portions extending between the first and second surface portions; and
a divider positioned in the inlet and generally aligned with the first surface portion, wherein the inlet includes a first flow channel between the divider and the second surface portion, and a second flow channel between the divider and the first surface portion, the first flow channel being configured to be coupled to an engine air intake of an aircraft auxiliary power unit, the second flow channel being configured to direct air away from the air intake, the first flow channel being positioned to direct air having a first total pressure level and a first distortion level, the second flow channel being positioned to direct air having a second total pressure level and a second distortion level, with:
(a) the first total pressure level higher than the second total pressure level; or
(b) the second distortion level higher than the first distortion level; or
(c) both (a) and (b).

14. The system of claim 13 wherein the inlet aperture has a generally rectangular shape.

15. The system of claim 13 wherein the inlet includes an inlet duct elongated in a direction generally transverse to a plane of the entrance aperture.

16. The system of claim 13, further comprising:
the auxiliary power unit, and wherein the air intake of the auxiliary power unit is coupled to the first flow channel of the inlet; and
a compartment disposed around the auxiliary power unit, wherein the second flow channel of the inlet is positioned to direct air into the compartment.

17. An inlet system for an aircraft auxiliary power unit, comprising:
an inlet having an entrance aperture; and
separation means for separating flow in the inlet into a first portion directed to an engine air intake of an aircraft auxiliary power unit and a second portion directed away from the air intake, the first portion having a first total pressure level and a first distortion level and the second portion having a second total pressure level and a second distortion level, with
(a) the first total pressure level higher than the second total pressure level, and
(b) the second distortion level higher than the first distortion level.

18. The system of claim 17 wherein the separation means includes a divider positioned in the inlet.

19. The system of claim 17 wherein the separation means includes a first divider and a second divider and wherein the first portion of the flow passes between the two dividers.

20. An aircraft, comprising:
a fuselage;
a wing;
an auxiliary power unit compartment carried by at least one of the fuselage and the wing;

an auxiliary power unit having an air intake and being housed in the auxiliary power unit compartment;

an inlet having an entrance aperture; and a divider positioned in the inlet, the divider being located to separate a first portion of the inlet from a second portion of the inlet, the first portion being coupled to the air intake of aircraft auxiliary power unit, the second portion being positioned to direct air away from the air intake and into the auxiliary power unit compartment, the divider being positioned to direct air having a first total pressure level and a first distortion level to the first portion of the inlet, and direct air having a second total pressure level and a second distortion level to the second portion of the inlet, with (a) the first total pressure level higher than the second total pressure level, and (b) the second distortion level higher than the first distortion level.

21. The aircraft of claim 20 wherein the entrance aperture of the inlet for the auxiliary power unit is positioned in an aft portion of the fuselage.

22. The system of claim 20 wherein the inlet aperture has a generally rectangular shape.

23. The system of claim 20 wherein the inlet includes an inlet duct elongated in a direction generally transverse to a plane of the entrance aperture.

24. The system of claim 20 wherein the divider includes a first divider and wherein the system further comprises a second divider, with the first portion of the inlet being positioned between the first and second dividers.

25. The system of claim 20, further comprising an inlet door positioned at least proximate to the entrance aperture of the inlet, the inlet door being movable relative to the aperture between an open position and a closed position.

26. An aircraft, comprising:

a fuselage;

a wing;

an auxiliary power unit compartment carried by at least one of the fuselage and the wing;

an auxiliary power unit having an air intake and being housed in the auxiliary power unit compartment;

an inlet having an entrance aperture, the entrance aperture having a first surface portion positioned to be proximate to a surface of the fuselage, a second surface portion spaced apart and aft of the first surface portion, and third and fourth surface portions extending between the first and second surface portions;

a first divider positioned in the inlet and generally aligned with the third surface portion;

a second divider positioned in the inlet and generally aligned with the fourth surface portion, wherein the inlet includes a first flow channel between the first and second dividers, a second flow channel between the first divider and the third surface portion, and a third flow channel between the second divider and the fourth surface portion, the first flow channel being coupled to the engine, air intake of the aircraft auxiliary power unit, the second and third flow channels being directed into the auxiliary power unit compartment; and an inlet door positioned at least proximate to the entrance aperture of the inlet, the inlet door being movable relative to the inlet aperture between an open position and a closed position, and wherein at least part of the inlet door sealably engages the first and second dividers when the inlet door is in the closed position.

27. The aircraft of claim 26 wherein the entrance aperture of the inlet has a generally rectangular shape.

28. A method for providing flow to an aircraft auxiliary power unit, comprising:

receiving flow in an inlet;

providing a first portion of the flow having a first total pressure level and a first distortion level to an engine air intake of an auxiliary power unit; and directing a second portion of the flow having a second total pressure level and a second distortion level away from the engine air intake, wherein (a) the first total pressure level is higher than the second total pressure level, and (b) the second distortion level is higher than the first distortion level.

29. The method of claim 28 wherein directing a second portion of the flow includes directing a vortex flow away from the engine air intake.

30. The method of claim 28 wherein directing a second portion of the flow includes directing a vortex while the aircraft operates on the ground.

31. The method of claim 28 wherein directing a second portion of the flow includes directing a second portion of the flow while the aircraft is in flight.

32. The method of claim 28 wherein directing a second portion of the flow includes directing the second portion of the flow into a compartment housing the auxiliary power unit.

33. A method for providing flow to an aircraft auxiliary power unit, comprising:

receiving a flow of air in an inlet having a first surface portion positioned to be proximate to an aircraft fuselage, a second surface portion spaced apart from the first surface portion, and third and fourth surface portions extending between the first and second surface portions;

a first divider positioned in the inlet and generally aligned with the third surface portion;

a second divider positioned in the inlet duct and generally aligned with the fourth surface portion;

separating flow in a first flow channel between the first and second dividers from flow in a second flow channel between the first divider and the third surface portion, and from flow in a third flow channel between the second divider and the fourth surface portion;

directing the flow in the first flow channel to an engine air intake of an aircraft auxiliary power unit; and directing the flows in the second and third flow channels to a compartment in which the auxiliary power unit is housed.

34. An inlet system for an aircraft auxiliary power unit, comprising:

an inlet having an entrance aperture; and first and second dividers positioned in the inlet, the dividers being located to separate a first portion of the inlet from second and third portions of the inlet, the first portion being configured to couple to an engine air intake of an aircraft auxiliary power unit, the second and third portions being configured to direct air away from the air intake, the dividers being positioned to direct air having a first total pressure level and a first distortion level to the first portion of the inlet, and direct air having a second total pressure level and a second distortion level to the second portion of the inlet, with (a) the first total pressure level higher than the second total pressure level, or (b) the second distortion level higher than the first distortion level, or both (a) and (b).

35. An inlet system for an aircraft auxiliary power unit, comprising:
- an inlet having an entrance aperture; and
- separation means for separating flow in the inlet into a first portion directed to an engine air intake of an aircraft auxiliary power unit and a second portion directed away from the air intake, wherein the separation means includes a first divider and a second divider and wherein the first portion of the flow passes between the two dividers, the first portion having a first total pressure level and a first distortion level and the second portion having a second total pressure level and a second distortion level, with
  - (a) the first total pressure level higher than the second total pressure level, or
  - (b) the second distortion level higher than the first distortion level, or both (a) and (b).

36. An aircraft, comprising:
- a fuselage;
- a wing;
- an auxiliary power unit compartment carried by at least one of the fuselage and the wing;
- an auxiliary power unit having an air intake and being housed in the auxiliary power unit compartment;
- an inlet having an entrance aperture; and
- first and second dividers positioned in the inlet to separate a first portion of the inlet from a second portion of the inlet, the first portion being positioned between the first and second dividers and being coupled to the air intake of aircraft auxiliary power unit, the second portion being positioned to direct air away from the air intake and into the auxiliary power unit compartment, the divider being positioned to direct air having a first total pressure level and a first distortion level to the first portion of the inlet, and direct air having a second total pressure level and a second distortion level to the second portion of the inlet, with
  - (a) the first total pressure level higher than the second total pressure level, or
  - (b) the second distortion level higher than the first distortion level, or both (a) and (b).

* * * * *